Figure 1:
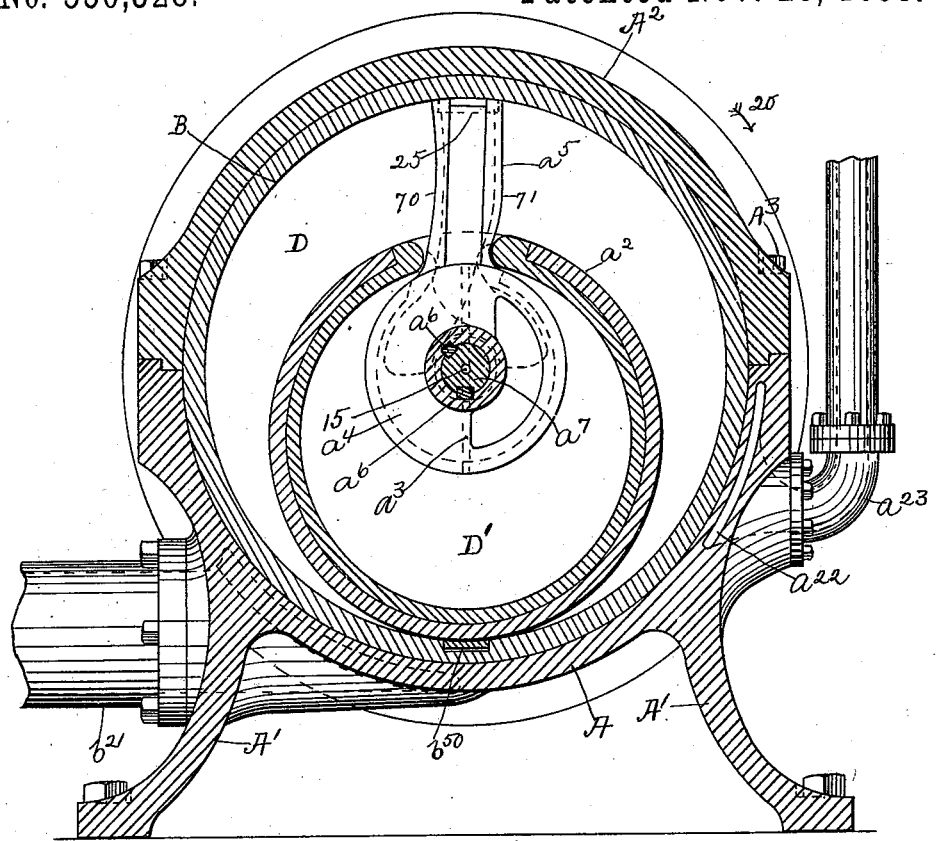

(No Model.) 4 Sheets—Sheet 1.
T. S. PUKERUD.
ROTARY ENGINE.

No. 550,328. Patented Nov. 26, 1895.

WITNESSES
Matthew M. Blunt
J. Murphy.

INVENTOR
Thomas S. Pukerud
by Jas. H. Churchill
Atty.

(No Model.)  4 Sheets—Sheet 2.

T. S. PUKERUD.
ROTARY ENGINE.

No. 550,328.  Patented Nov. 26, 1895.

WITNESSES.
Matthew M. Blunt.
J. Murphy.

INVENTOR.
Thomas S. Pukerud
by Jas. H. Churchill
Atty.

(No Model.)  T. S. PUKERUD.  4 Sheets—Sheet 3.
ROTARY ENGINE.

No. 550,328.  Patented Nov. 26, 1895.

WITNESSES.
Matthew M. Blunt.
J. Murphy.

INVENTOR.
Thomas S. Pukerud
by Jas. H. Churchill
Atty.

(No Model.) 4 Sheets—Sheet 4.

T. S. PUKERUD.
ROTARY ENGINE.

No. 550,328. Patented Nov. 26, 1895.

WITNESSES.
Matthew M. Blunt.
J. Murphy.

INVENTOR.
Thomas S. Pukerud
by Jas. H. Churchill
Atty.

UNITED STATES PATENT OFFICE.

THOMAS S. PUKERUD, OF BOSTON, MASSACHUSETTS.

ROTARY ENGINE.

SPECIFICATION forming part of Letters Patent No. 550,328, dated November 26, 1895.

Application filed January 4, 1894. Serial No. 495,596. (No model.)

*To all whom it may concern:*

Be it known that I, THOMAS S. PUKERUD, a subject of the King of Sweden and Norway, residing in Boston, in the county of Suffolk and State of Massachusetts, have invented an Improvement in Rotary Engines or Motors, of which the following description, in connection with the accompanying drawings, is a specification, like letters and figures on the drawings representing like parts.

This invention relates to a rotary engine or motor embodying novel principles and features of construction, as will be described.

The engine or motor referred to may be actuated by steam, hot air, gas, water, or other suitable medium or agent, but to facilitate description it will be hereinafter referred to as "a steam-engine." The engine or motor may be single or compound, and in the present instance I have chosen to illustrate it as a compound engine or motor having high and low pressure cylinders.

In accordance with this invention the engine comprises a cylinder, a rotary arm or piston, and a movable abutment, cylinder, or ring within the main or outer cylinder and movable about a center different from that on which the rotary arm or piston moves.

In accordance with this invention the piston or arm is movable about a center within the movable abutment, cylinder, or ring, and the said arm or piston is extended through a suitable opening in the movable cylinder or ring, so that the rotation of the piston or arm about one center produces rotation of the movable abutment, cylinder, or ring about another center. The piston or arm in the present instance is cored or formed with passages or ports, as will be described, which communicate with the supply and with the exhaust for the medium or agent used to drive the engine or motor, which medium, as above set forth, may be regarded as steam. In the rotation of the piston and movable cylinder or ring the steam, during the said rotations, acts upon the piston both within and without the movable cylinder or ring, and the latter co-operates with the main cylinder and with the piston in such manner, as will be described, as to form two abutments against which the steam may act to drive the piston.

In a multiple or compound engine one rotary piston may be driven by the exhaust-steam from the inner and outer cylinders of the other engine, and this may and preferably will be accomplished by constructing the pistons so that they abut one another, with the exhaust port or passage of one piston coinciding with the inlet port or passage of the other piston.

The engine or motor possesses further novel features of construction, which, together with the aforementioned features, will be hereinafter pointed out in the claims at the end of this specification.

Figure 2:
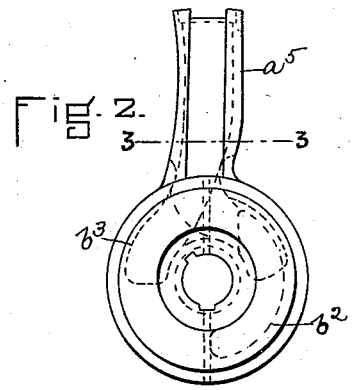
Figure 3:
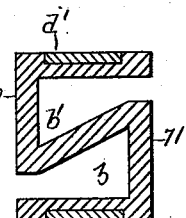
Figure 5:
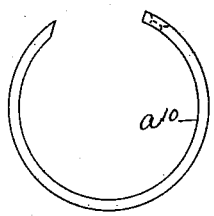
Figure 4:
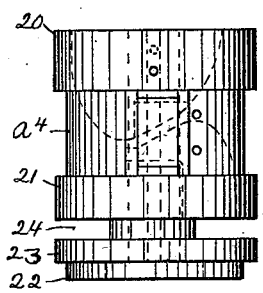
Figure 6:
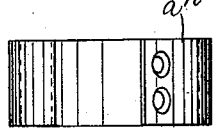
Figure 7:
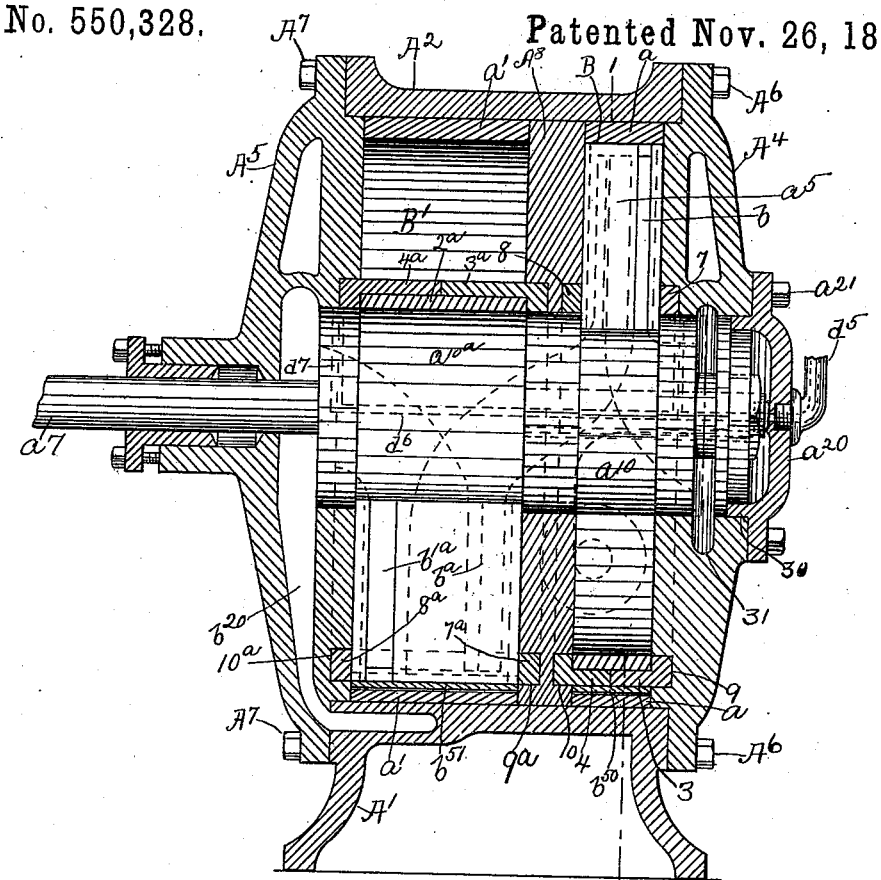
Figures 8, 9, 10:
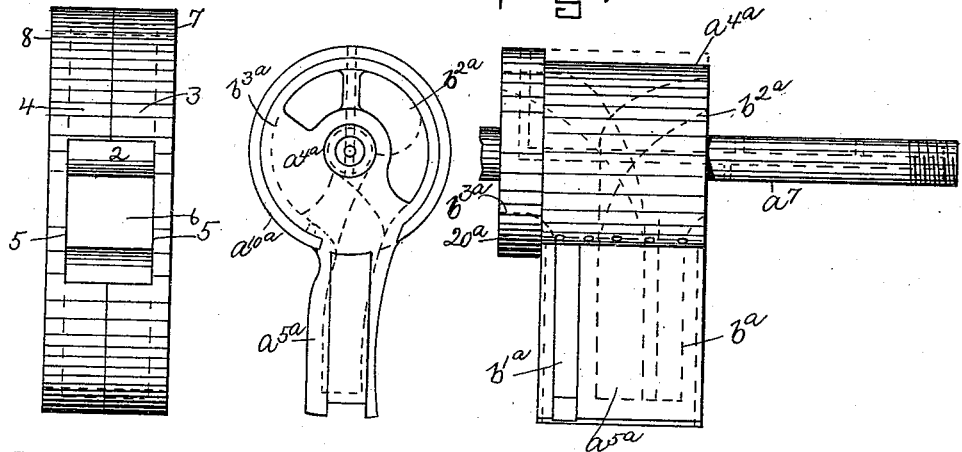
Figure 11:
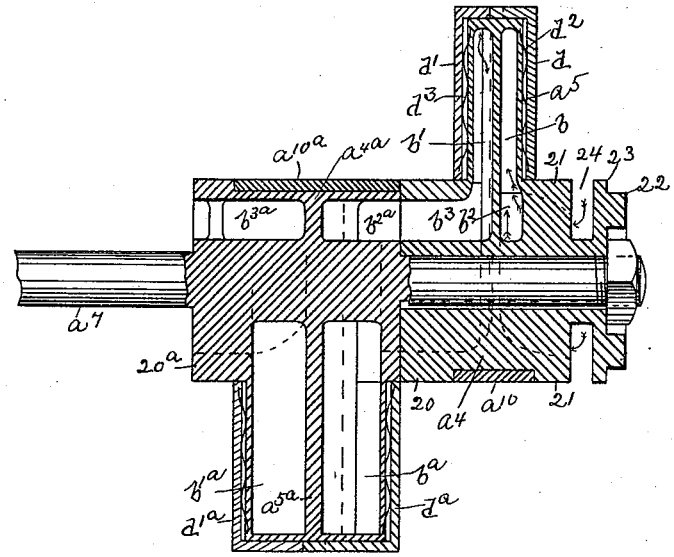

Figure 1 is a vertical radial section of one form of rotary engine or motor embodying this invention, the section being taken on the line 1 1, Fig. 7, the piston being shown in elevation. Fig. 2 is a detail in side elevation of the piston shown in Fig. 1; Fig. 3, a sectional detail on the line 3 3, Fig. 2, to clearly show the arrangement of ports in said piston; Fig. 4, a top or plan view of the piston shown in Fig. 2; Figs. 5 and 6, details to be referred to; Fig. 7, a longitudinal or axial section of the engine shown in Fig. 1, the pistons being shown in elevation; Fig. 8, a front elevation of the piston in the cylinder at the left in Fig. 7, and which cylinder may be termed the "low-pressure cylinder;" Fig. 9, a side elevation of the piston shown in Fig. 8, looking toward the left; Fig. 10, a detail of the movable abutment, cylinder, or ring; Fig. 11, a longitudinal or axial sectional detail of the pistons to more clearly show the arrangement of ports; and Figs. 12, 13, and 14 diagrammatic views to illustrate the working of the engine or motor.

In the engine or motor herein shown as embodying this invention, the stationary portion of the same may and preferably will be made as represented in Figs. 1 and 7, it consisting of a lower semicylindrical part or casting $A$, provided with suitable legs or supports $A'$, an upper semicylindrical part or cover $A^2$ firmly secured to the lower part $A$, as by suitable bolts $A^3$, (see Fig. 1,) and two side or end plates $A^4 A^5$, firmly secured to the parts $A A^2$, as by the bolts $A^6 A^7$.

The parts $A A^2 A^4 A^5$, when assembled together, form a main casing, which in the present embodiment of the invention is subdivided by an annular partition or wall $A^8$ into two chambers or cylinders B B', in which are preferably located annular rings $a$ $a'$, forming, to all intents and purposes, a portion of the main casing or frame of the engine or motor, the said rings being stationary and forming the inner cylindrical wall of the chambers B B'.

The chamber B in accordance with this invention contains within it a movable abutment made as a cylinder or ring $a^2$, (see Fig. 1,) the said ring being of smaller diameter than the chamber B and movable about a center, as $a^3$. The movable cylinder or ring $a^2$ to facilitate construction may and preferably will be made of three parts, as represented in Fig. 10—namely, the inner band 2 and the outer bands 3 4—fitted together over the inner band 2 and cut away, as at 5, the inner band 2 being made less than a complete circle and having the space between its ends coincident with the slot or opening 6, formed by the cut-away portions 5 of the parts or bands 3 4, when the latter are fitted upon the band 2, as represented in Fig. 10.

The parts 3 and 4, when fitted together, form a complete band or ring of greater width than the band 2, so as to leave on each side of the band 2 projecting annular ribs or flanges 7 8, which fit into suitable annular grooves 9 10 (see Fig. 7) in the side plate $A^4$ and in the division-wall $A^8$, respectively, the grooves 9 10 being preferably made of such depth that the sides of the band 2 are substantially flush with the side plate $A^4$ and division-wall $A^8$.

The movable cylinder or ring $a^2$ has co-operating with it a movable piston, (shown in the present instance as consisting of a hub $a^4$ and an arm $a^5$,) the hub $a^4$ being secured by keys $a^6$ or otherwise (see Fig. 1) to a shaft $a^7$. The hub $a^4$ of the piston is located within the movable cylinder or ring $a^2$ and moves about the point 15 as a center, and the arm $a^5$ of the piston is extended through the opening 6 of the movable abutment, ring, or cylinder $a^2$.

The piston referred to may and preferably will be constructed as shown in Figs. 2, 3, 4, and 11, the hub $a^4$ being provided on opposite sides of the arm $a^5$ with two enlargements or collars 20 21 and with a third collar or enlargement 22, provided with an annular flange 23, which latter is separated from the collar or enlargement 21 by a suitable space 24, for a purpose as will be described.

The portion of the hub between the collars 20 21 may and preferably will have secured to it a metal packing ring or band $a^{10}$, for a purpose as will be described.

The arm $a^5$ may and preferably will be made after the manner represented in cross-section, Fig. 3, and in longitudinal section, Fig. 11, so as to form two longitudinal ports or passages $b$ $b'$ in opposite faces 70 71 of the piston-arm, the said ports communicating, respectively, with the passages $b^2$ $b^3$ in the hub $a^4$ of the piston, one passage, as $b^2$, being made to open through the side or end of the hub $a^4$, on which is located the collar 21, and the other passage, as $b^3$, being made to open through the side or end of the hub $a^4$, on which is located the collar 20.

For sake of distinction the passages $b^2$ and $b$ may be hereinafter referred to as the steam-inlet passages or passage and the passages $b'$ $b^3$ as the steam outlet or exhaust passages or passage for the piston.

By reference to Fig. 3 it will be seen that one of these passages, as $b$, extends longitudinally through the arm $a^5$ on one face, as 70, and the passage $b'$ extends longitudinally through the arm on the other or opposite face, as 71. These passages are preferably closed at the upper end of the arm $a^5$ by making the end of the arm solid, as represented by the dotted line 25, Fig. 1, and by the full lines in Fig. 11. In the present embodiment of this invention the collars 20 and 21 form journal-bearing for the piston and are supported in suitable annular holes or openings in the side $A^4$ and in the division-wall $A^8$, and, as represented in Fig. 7, the flange 23 on the collar 22 abuts against an annular flange 30 on a cap $a^{20}$, secured to the side $A^4$, as by bolts or screws $a^{21}$.

The side plate $A^4$, as represented in Fig. 7, is preferably provided with an annular groove 31, which registers with the passage 24, between the flange 23 and the collar 21, so as to form an annular steam-passage, which in practice is connected by a suitable passage or duct $a^{22}$ (see Fig. 1) with the steam-inlet pipe or passage $a^{23}$ for the engine or motor, the latter being connected to a boiler or suitable source of supply.

The parts thus far described constitute what may be termed the high-pressure cylinder of the engine or motor, and the low-pressure cylinder of the engine or motor shown in Fig. 7 may have its piston and movable abutment, cylinder, or ring constructed in a similar manner, and to distinguish the parts of the movable cylinder or ring in the low-pressure cylinder I prefer to identify the like parts by the affix "a." The piston in the low-pressure cylinder B' may and preferably will be of substantially the same general construction as the piston of the high-pressure cylinder, except that, as represented in Fig. 8, it may have but a single collar $20^a$, the other end of the hub $a^{4a}$ of the piston abutting against the collar 20 on the hub $a^4$ of the high-pressure piston.

The steam-passages $b^a$ $b'^a$ in the arm $a^{5a}$ and the steam passages or ports $b^{2a}$ $b^{3a}$ in the hub $a^{4a}$ of the piston are of substantially the same construction as those described in connection with the high-pressure piston, with the exception that the steam-inlet passage $b^{2a}$ coincides with the steam-outlet passage $b^3$ of the high-pressure cylinder, while the steam-outlet passage $b^{3a}$ communicates with a passage $b^{20}$ (see Fig. 7) formed in the side $A^5$ and communicating with the exhaust-pipe $b^{21}$ for the engine or motor.

The movable abutment, cylinder, or ring $a^{2a}$ of the low-pressure cylinder has its side flanges $7^a$ $8^a$ fitted into annular grooves $9^a$ $10^a$ in the division-wall $A^8$ and the side plate $A^5$, respectively, and the said ring or movable cylinder is provided with an opening $6^a$ through which the arm $a^{5a}$ is extended. The movable abutments or rings $a^2$ $a^{2a}$ are made in such manner as to make contact with the inner circumference of the wall of the cylinders B B', and to guard against any possible leakage of steam I prefer to provide between the point of contact of the movable rings or abutments and the inner walls of the cylinders B B' suitable packing represented as strips $b^{50}$ $b^{51}$. (See Fig. 7.) Furthermore, the hub of the pistons co-operate with the movable cylinders $a^2$ $a^{2a}$, so that the inner wall or circumference of the movable rings form an abutment with the pistons, as will be more fully explained.

The sides of the piston-arms $a^5$ $a^{5a}$ are preferably provided with piston-packings $d$ $d'$, which may be made as herein shown, (see Figs. 3 and 11,) the said packings consisting of angular metal pieces fitted into suitable slots in the sides and top or end of the arms, whereby a perfectly-tight joint may be effected between the sides and ends of the pistons and the walls of the cylinders in which they revolve. To assist in obtaining the tight fit metal spring-strips $d^2$ $d^3$ may be interposed between the piston-packings and the sides of the arm.

Figure 12:
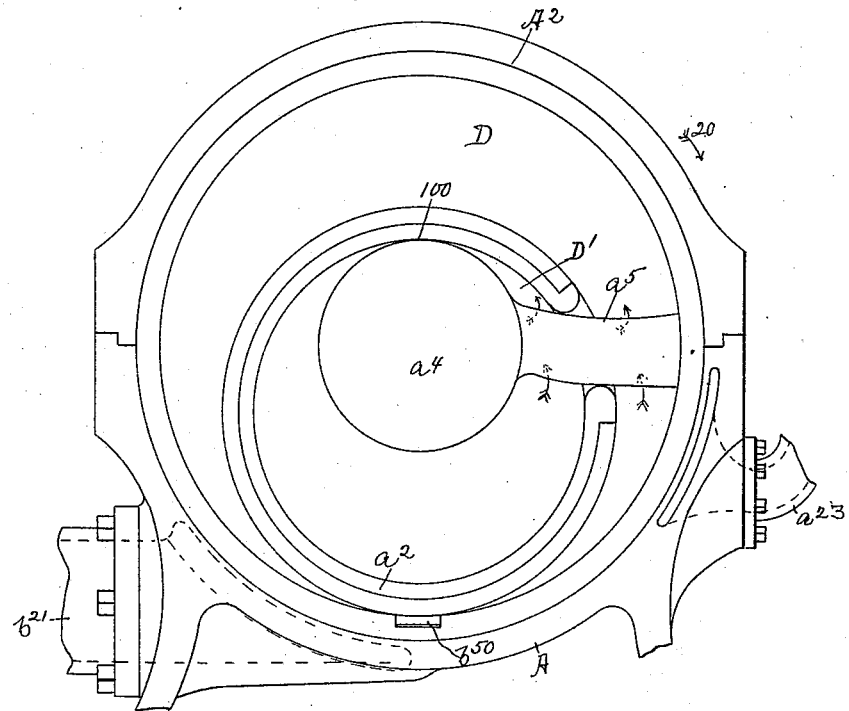
Figure 13:
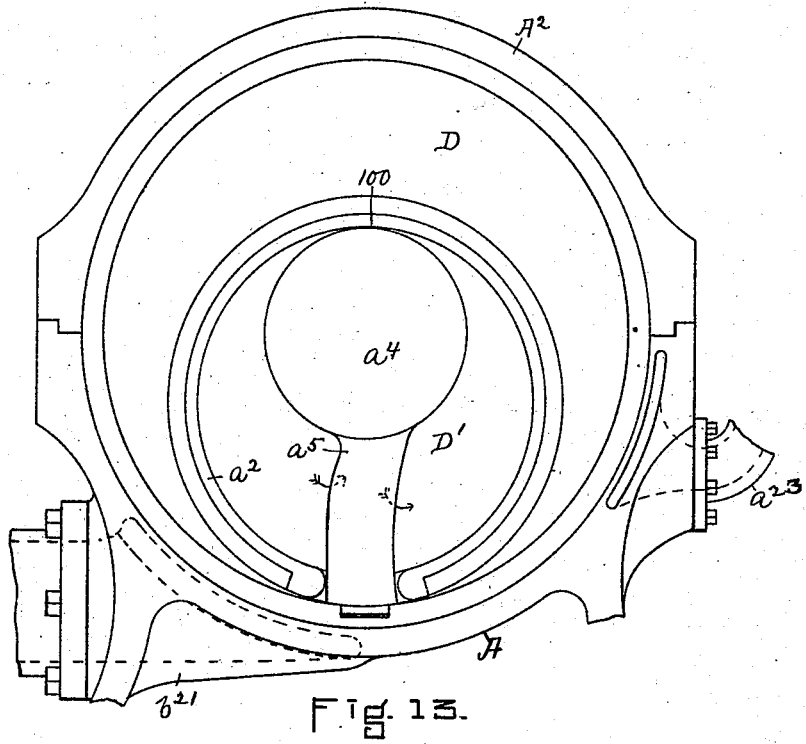
Figure 14:
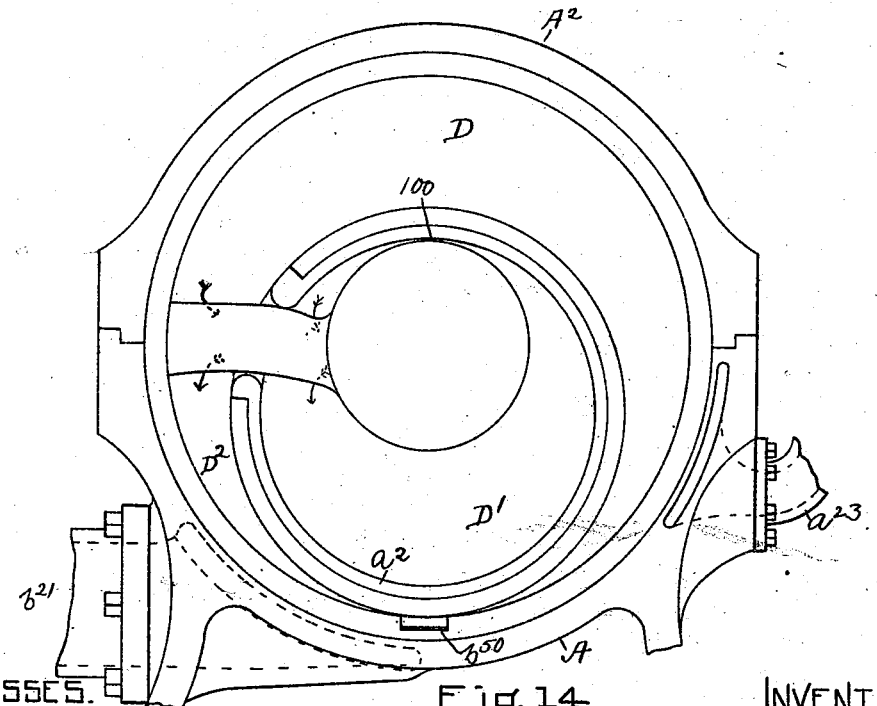

The operation of my improved engine or motor may be readily understood by reference to Figs. 12, 13, and 14.

Let it be supposed that the piston is rotating in the direction of arrow 20, Fig. 1. The steam from the steam-inlet pipe $a^{28}$ passes through the port or passage $a^{22}$ into the annular space 24. As the piston-hub $a^4$ and its arm $a^5$ are rotated about the center 15 in the direction indicated by the arrow 20, the piston-arm $a^5$, in its rotation, carries with it the movable abutment, cylinder, or ring $a^2$ in a circle about the center $a^3$, and as the piston and ring are moved from the position shown in Fig. 1 to a position substantially diametrically opposite (indicated in Fig. 13) the position of the piston and ring relative to each other is changed. In the position of the piston and ring shown in Fig. 1 the entire piston-arm is substantially outside of the ring $a^2$ and is being acted upon by live steam admitted into the space D, and none or substantially none of the piston-arm is being acted upon by live steam within the ring $a^2$; but by reason of the said arm and ring moving on different centers, as described, a space for the admission of live steam is formed within the movable ring as soon as the face 70 of the piston-arm has passed the diametrical line through the centers 15 and $a^3$, and this space, marked D' in Figs. 12, 13, and 14, is formed between the face 70 of the piston-arm and the point of contact of the piston-hub with the inner wall of the movable ring or abutment, which point of contact may be represented at 100, Fig. 12, and in the further movement of the piston and ring in the direction indicated by arrow 20, the space D' increases in size, and the area of the piston-arm $a^5$ within the ring $a^2$ acted upon by live steam admitted into the space D' increases in proportion and to substantially the same amount the area of the piston-arm acted upon by live steam outside of the ring $a^2$ is diminished in the rotation of the said piston and ring from the position shown in Fig. 1 to that indicated in Fig. 13. The progressive decrease in area of the piston-arm acted upon by live steam outside of the movable ring $a^2$ in the movement of the piston and ring from the position shown in Fig. 1 to that indicated in Fig. 13 is compensated for or offset by the progressive increase in area of the piston-arm acted upon by live steam within the movable ring. When the piston and ring have reached the position indicated in Fig. 13, the admission of live steam to the space D outside the movable ring $a^2$ is cut off by the abutment of the said ring with the inner wall of the main cylinder B, and the said steam space is at such time practically changed into an exhaust-steam space for the remaining half of the rotation or revolution of the piston and ring, and substantially the entire area of the piston-arm acted upon by live steam is within the movable ring and is acted upon by the live steam in the space D'. On the continued rotation of the piston and movable ring from the position indicated in Fig. 13 the area of the piston-arm acted upon by live steam within the movable ring is progressively diminished, and after the arm $a^5$ has passed the diametrical line through the centers 15 and $a^3$, a live-steam space is created outside of the movable ring, which space is marked $D^2$ in Fig. 14, and the area of the piston-arm, acted upon by live steam admitted into this space $D^2$ from the time it is formed until the arm reaches the position shown in Fig. 1 is gradually and progressively increased in proportion as the area of the piston-arm, acted upon by live steam within the movable ring, is decreased. On the movement of the piston and ring from the position indicated in Fig. 13 to that shown in Fig. 1, the exhaust-steam in the space D passes out through the ports $b'$ $b^3$, and when the piston and ring have reached the portion shown in Fig. 1 the steam-space D' is cut off from the steam-supply by the abutment of the piston against the movable ring, and this steam-space, which contained live steam while the piston and ring were moving from the position indicated in Fig. 13 to that shown in Fig. 1, is converted into an exhaust-steam space, and on the second revolution or rotation of the piston and ring this space D' is connected with the exhaust ports or passages $b'$ $b^3$.

In the case of a single engine the exhaust-steam might pass to a condenser, or it may be to the atmosphere, and in the case of a multiple or compound engine the steam passing through the passages $b'$ $b^3$ may pass through the ports or passages $b^{2a}$ $b^a$ of the piston and in the position of the pistons represented in Fig. 7 the said steam would be admitted into the steam-space within the movable abutment or ring $a^{2a}$, and would act upon the piston-arm $a^{5a}$ within the said movable abutment, this position of the hub $a^{4a}$ and piston-arm $a^{5a}$ corresponding to the position of the piston $a^5$. (Shown in Fig. 13.) In other words, as shown in Figs. 7 and 11, the pistons are set at an angle of substantially one hundred and eighty degrees apart; but they may be located at any desired or suitable angle.

It will be seen from the above description that the rotary piston in the high-pressure cylinder is acted upon throughout its complete revolution by live steam at full boiler-pressure, and that substantially the same area of the piston is acted upon throughout its entire rotation or revolution, and that in the case of the piston within the cylinder B' the steam exhausted from the cylinder B and from the chamber formed by the movable abutment or ring $a^2$ acts upon substantially the entire area of the piston-arm $a^{5a}$ throughout the entire revolution of the piston. Furthermore, it will be noticed that a free exhaust is provided for the steam. The steam passing through the exhaust-passages $b'^a$ $b^{3a}$ of the piston in the cylinder B' passes into the exhaust passage or chamber $b^{20}$ and from thence passes out through the exhaust-pipe $b^{21}$.

In the present construction of the engine or motor the steam admitted into the channel 24, between the collar 21 and the flange 23, acts against the said flange to keep it pressed against the flange 30 on the cap $a^{20}$, and as a result effectively balances the pistons. The journal bearings or collars 21, 20, and 40 may and preferably will be lubricated by means of oil admitted through the pipe $d^5$, (see Fig. 7,) which communicates with a central port or passage $d^6$ in the shaft $a^7$, which central port or passage may communicate with radial ports or passages $d^7$, made in the collars 21 20 and $20^a$, as represented in Fig. 7.

It will be noticed that the movable abutment rotating about a center different from the center on which the piston rotates co-operates with the rotary piston in such manner as to form two co-operating variable live-steam spaces and two co-operating variable exhaust-steam spaces, which co-operate together to maintain practically a single live-steam space of maximum or substantially constant area throughout the entire revolution or rotation of the piston, and at the same time the two variable exhaust-steam spaces co-operate to maintain practically an exhaust-steam space throughout the complete revolution of the piston, whereby substantially the same area of the piston is acted upon by full pressure of steam throughout the complete revolution of the piston.

I have specifically described the operation of my improved rotary engine or motor as a rotary steam engine, but I do not desire to limit my invention in this respect, as other agents or means may be used to drive the piston and ring or movable abutment. For instance, water or other liquid may be used, and when such an agent is used the apparatus may be used as a water-meter, and, furthermore, the piston and movable ring may be mechanically driven, as by a belt or gearing, and the engine or motor in such case might be used as a pump.

When a medium, which is not commonly classed as expansive is used as a water-power, a single cylinder will preferably be used, but, if desired, two or more cylinders of the same, or substantially the same size may be used. Furthermore, when steam or like expansive agent is used, any desired number of cylinders may be used.

I do not desire to limit my invention to the precise mechanical construction herein shown, as the same may be changed in detail.

I prefer to make the outer cylinder substantially as herein shown with the rings $a$ $a'$ separate from the casing, and I may find it desirable to fasten the rings $a$ $a'$ to the pistons in the cylinders B B', and in this case the rings $a$ $a'$ will move with the pistons in a circle about the center 15 and the operation of the engine will remain substantially the same as above described, except that in this latter case the packing-strips $b^{50}$ $b^{51}$ may be omitted.

I claim—

1. In a rotary engine or motor, the combination of the following instrumentalities, viz:— a main cylinder, a piston rotating therein and consisting of a hub provided with an inlet and with an outlet port or passage and having an arm provided on one face with a port communicating with the inlet port of the hub and on its opposite face with a port communicating with the exhaust port of the said hub, and a movable abutment consisting of a ring or cylinder forming an abutment within the main cylinder and with the piston, whereby steam may pass from the inlet port of the said arm within and without the cylinder or ring and whereby steam may pass from within and without the cylinder or ring into the exhaust port of the said arm, substantially as described.

2. In a rotary engine or motor, the combination of the following instrumentalities, viz:— a main cylinder, a movable cylinder or ring within the said main cylinder, and a piston rotating within the main cylinder on a center different from that on which the movable cylinder or ring rotates and provided with an inlet port or passage in one face, and with an exhaust port or passage on the opposite face of the said piston, which ports communicate in the rotation of the piston with the main cylinder and with the movable cylinder or ring to admit steam into both cylinders and to exhaust steam from the same, substantially as described.

3. In a rotary engine or motor, the combination of the following instrumentalities, viz:—a main cylinder, an abutment movable therein on a center different from the center of the main cylinder, and a hollow rotary piston provided with an arm having inlet and exhaust ports or passages to admit steam between the abutment and the main cylinder and between the abutment and the said piston, and to exhaust steam from between the abutment and the main cylinder and also from between the abutment and the piston, substantially as described.

In testimony whereof I have signed my name to this specification in the presence of two subscribing witnesses.

THOMAS S. PUKERUD.

Witnesses:
JAS. H. CHURCHILL,
J. MURPHY.